DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 21, 1971

890 O.G. 980

T890,007
CHLORINATED CARBOXYL GROUP CONTAINING RUBBERS

Paul D. Folzenlogen, Windell C. Watkins, and Hugh J. Hagemeyer, Jr., all of P.O. Box 2068, Longview, Tex. 75603

Continuation of application Ser. No. 819,112, Apr. 24, 1969. This application Sept. 21, 1970, Ser. No. 74,231
Int. Cl. C08c *5/02;* C08d *5/04;* C08f *27/03*
U.S. Cl. 260—78.4D
No Drawing. 12 Pages Specification

This invention relates to chlorinated carboxyl group containing rubbers which can be prepared by chlorinating a carboxyl group containing rubber. These rubbers are useful in forming coating compositions which have excellent adhesion to substrates such as metal, wood, and concrete.